(12) United States Patent
Hatfield et al.

(10) Patent No.: US 11,835,181 B2
(45) Date of Patent: Dec. 5, 2023

(54) ATTACHABLE/DETACHABLE PRESSURE EVACUATION DEVICE

(71) Applicant: Western Valve Inc., Amarillo, TX (US)

(72) Inventors: Dennis C. Hatfield, Amarillo, TX (US); Steve K. Aderholt, Amarillo, TX (US)

(73) Assignee: Western Valve Inc., Amarillo, TX (US)

( * ) Notice: Subject to any disclaimer, the term of this patent is extended or adjusted under 35 U.S.C. 154(b) by 0 days.

(21) Appl. No.: 17/001,620

(22) Filed: Aug. 24, 2020

(65) Prior Publication Data

US 2022/0057047 A1 Feb. 24, 2022

(51) Int. Cl.
| | | |
|---|---|---|
| *F17C 13/04* | (2006.01) | |
| *F16K 1/30* | (2006.01) | |
| *F17C 7/00* | (2006.01) | |

(52) U.S. Cl.
CPC ............ *F17C 13/04* (2013.01); *F16K 1/302* (2013.01); *F17C 7/00* (2013.01); *F17C 2201/0109* (2013.01); *F17C 2205/0329* (2013.01); *F17C 2205/0394* (2013.01)

(58) Field of Classification Search
CPC ......... Y10T 137/6188; Y10T 137/6184; Y10T 137/87973; F16K 17/16; F17C 2205/0329
USPC .................................. 251/128, 291
See application file for complete search history.

(56) References Cited

U.S. PATENT DOCUMENTS

| | | | | |
|---|---|---|---|---|
| 460,075 | A * | 9/1891 | Schmedling | F16L 37/36 137/614.06 |
| 1,525,775 | A * | 2/1925 | Floyd | F22B 37/423 137/71 |
| 1,848,691 | A * | 3/1932 | Beach | F16K 35/06 73/152.01 |
| 2,308,791 | A * | 1/1943 | Sundstrom | G01F 23/0053 251/144 |
| 2,438,776 | A * | 3/1948 | Boylan | F25B 41/40 137/625.5 |
| 2,739,612 | A * | 3/1956 | Hansen | F16K 31/50 137/614.05 |
| 3,552,421 | A * | 1/1971 | Yocum | F16K 43/00 137/321 |
| 4,142,546 | A * | 3/1979 | Sandau | F15B 1/08 137/321 |
| 4,383,548 | A * | 5/1983 | Durenec | F16K 31/44 137/321 |

(Continued)

OTHER PUBLICATIONS

Compressed Gas Association, "Pressure Relief Device Standards—Part 1—Cylinders for Compressed Gasses", 2011, 14th Edition, CGA S-1.1-2011, The Compressed Gas Association, Inc., Chantilly, USA. (7 pages).

(Continued)

*Primary Examiner* — Kenneth Rinehart
*Assistant Examiner* — Nicole Gardner
(74) *Attorney, Agent, or Firm* — Clark Hill PLC

(57) ABSTRACT

A pressure evacuation device for a compressed gas cylinder having a fixed assembly that is semi-permanently attached to an opening in the cylinder and comprises a retractable bleed valve, and a detachable assembly that can be readily attached to and detached from the fixed assembly and comprises a valve stem to control the bleed valve and a valve tee to direct the flow of gas from the cylinder.

24 Claims, 12 Drawing Sheets

(56) References Cited

U.S. PATENT DOCUMENTS

| | | | |
|---|---|---|---|
| 4,603,796 A * | 8/1986 | Joly | F16K 39/022 222/3 |
| 6,742,538 B1 * | 6/2004 | Aderholt | F16K 17/16 137/68.12 |
| 2004/0226604 A1 * | 11/2004 | Aderholt | F16K 1/305 137/71 |
| 2018/0045373 A1 * | 2/2018 | Frenal | F17C 7/00 |
| 2020/0256516 A1 * | 8/2020 | Ligonesche | F17C 13/04 |

OTHER PUBLICATIONS

Compressed Gas Association, "Pressure Relief Device Standards—Part 1—Cylinders for Compressed Gasses", 2011, 14th Edition, CGA S-1.1-2011, Excerpts from §4.3.1 and §4.3.2, The Compressed Gas Association, Inc., Chantilly, USA. (4 pages).

Devany, Mary C., "Safe Handling of Compressed Gas Cylinders", Abstract downloaded from onepetro.org, Presented at the ASSE Professional Development Conference and Exposition, Jun. 7, 2004, Paper No. ASSE-04-643-1 (4 pages).

East Carolina University "ECU" Office of Environmental Health and Safety, "Compressed Gas", downloaded at oehs.ecu.edu/industrial-hygiene/compressed-gas, © 2022 (12 pages).

Air Liquide, "Convenient Cylinder Sizes", Screen shots of low-pressure cylinders downloaded from industry.airliquide.us/low-pressure-cylinders and high-pressure cylinders downloaded from industry.airliquide.us/high-pressure-cylinders (2 pages).

Weed, Robert D., & Hipchen, John C., "Benefits of Reduced Diameter Copper Tubes in Evaporators and Condensers", p. 6, 2012 (8 pages).

Hipchen, John C., Weed, Robert D., Zhang, Ming & Nasuta, Dennis, "Simulation-Based Comparison of Optimized AC Coils Using Small Diameter Copper and Aluminum Micro-Channel Tubes", Purdue University, Purdue e-Pubs, International Refrigeration and Air Conditioning Conference, School of Mechanical Engineering, p. 2, 2012, (11 pages).

* cited by examiner

ATTACHABLE/DETACHABLE PRESSURE EVACUATION DEVICE

RELATED APPLICATIONS

None.

BACKGROUND OF THE INVENTION

A pressure relief device on a compressed gas cylinder provides a means of venting excess pressure to prevent the rupture of the cylinder. For example, if the cylinder is exposed to extreme heat, the gas within the cylinder will expand, creating the risk of an uncontrolled rupture of the cylinder, which may cause injury, death, and property damage. A reclosing pressure relief device may include a spring-loaded valve that will keep the valve closed under normal pressure conditions. Under high pressure conditions the spring will compress, opening the valve and allowing the gas to vent out of the cylinder. Once safe pressure conditions have been restored, the spring pushes the valve closed. A non-reclosing pressure relief device may include a disk having a design and composition known to rupture at a predetermined pressure. If the gas pressure exceeds that pressure, the disk will rupture allowing the gas to vent. The pressure relief device remains open until the ruptured disk is replaced.

The Compressed Gas Association (CGA) publishes the CGA S-1.1 Pressure Relief Devices Standards representing the minimum requirements for pressure relief devices considered to be appropriate and adequate. However, under the most recent versions of the CGA S-1.1 standard, use of a pressure relief device is now optional in some circumstances. The CGA position is that in the event of a fire, the seals in the cylinder valves and end plugs will leak, which will prevent the buildup of excessive pressure inside the cylinder. As such, without a pressure relief device, the only controllable mechanisms for venting gas in case of an emergency is the primary cylinder valve, but this valve may have been damaged or become inaccessible by the circumstances which caused the emergency in the first place.

As such, there is a need for a pressure evacuation device that can be attached and used in case of emergency and then removed once safe conditions have been restored.

SUMMARY OF THE INVENTION

Embodiments of the present invention solve the problem of venting excessive pressure from a gas cylinder by using a two component pressure evacuation device, the first component comprising a bleed valve inside a bull plug which is inserted into an opening of the gas cylinder and the second component comprising a readily attachable and detachable valve stem and tee.

The bull plug screws into the gas cylinder and becomes a fixed component of the cylinder, except during maintenance of the cylinder. The bull plug has an opening leading to the interior of the cylinder, an opening leading to the exterior of the cylinder, and threaded bleed valve assembly between the openings. Rotating the bleed valve assembly one direction pulls the bleed valve away from its seat and exposes the bleed holes to the opening leading to the interior of the gas cylinder; rotating the assembly the other direction pushes the bleed valve back into the seat and covers the bleed holes to prevent gas from escaping from the cylinder.

Under normal operations, the bleed valve is closed to the cylinder interior and a safety plug covers the external opening in the bull plug. Under emergency operations, the user removes the safety plug and screws the detachable valve stem and tee assembly into the opening in the bull plug. Once the end of the valve stem engages with the bleed valve assembly, the user rotates the valve stem to open the bleed valve, allowing gas to exit the cylinder through the valve tee and out a vent port. Once enough gas has been vented from the cylinder, the user rotates the valve stem to close the bleed valve, unscrews the detachable valve stem and tee assembly from the bull plug, and replaces the safety plug.

Upon review of the drawings and detailed descriptions of the embodiments that follow, those skilled in the art will recognize other embodiments that capture the essential features of the present invention.

DETAILED DESCRIPTION OF THE INVENTION

Figure 1:
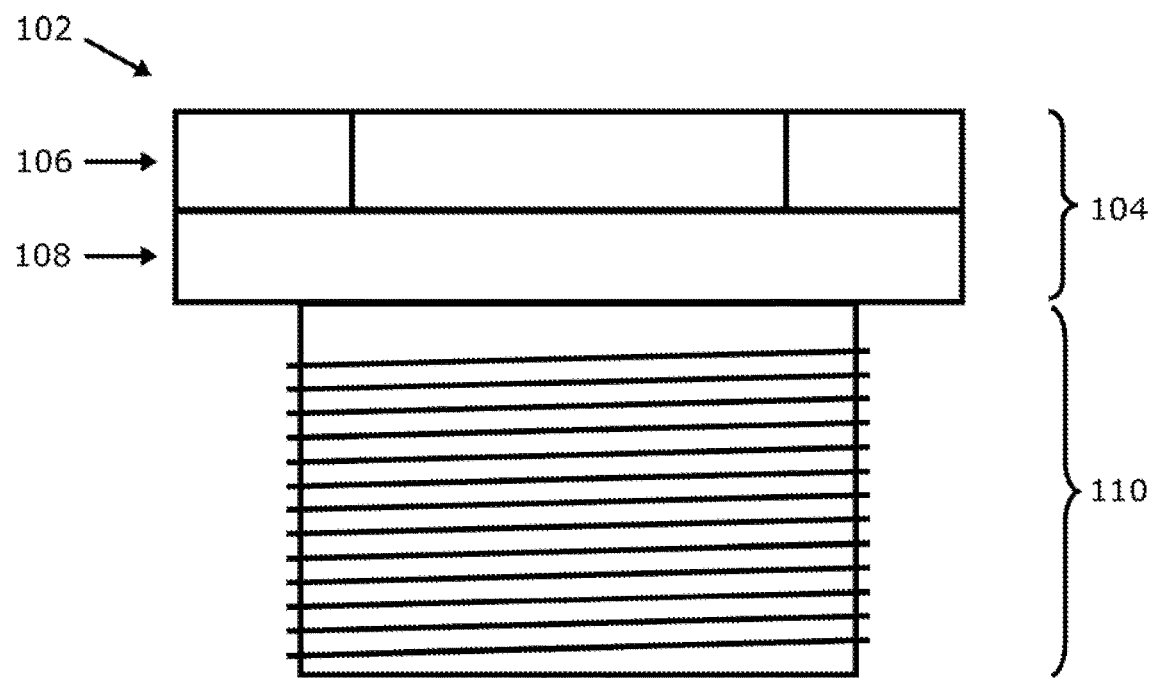
FIG. 1 is a side view of a bull plug in an embodiment of the present invention.
Figure 2:
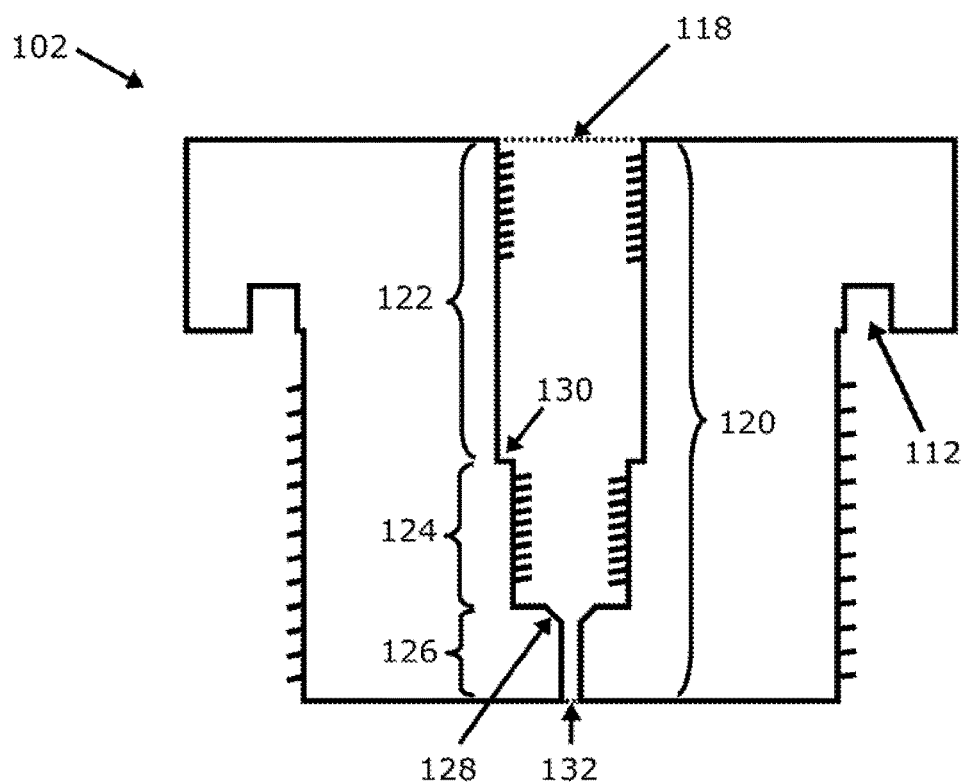
FIG. 2 is a side cutaway view of a bull plug in an embodiment of the present invention.
Figure 3:
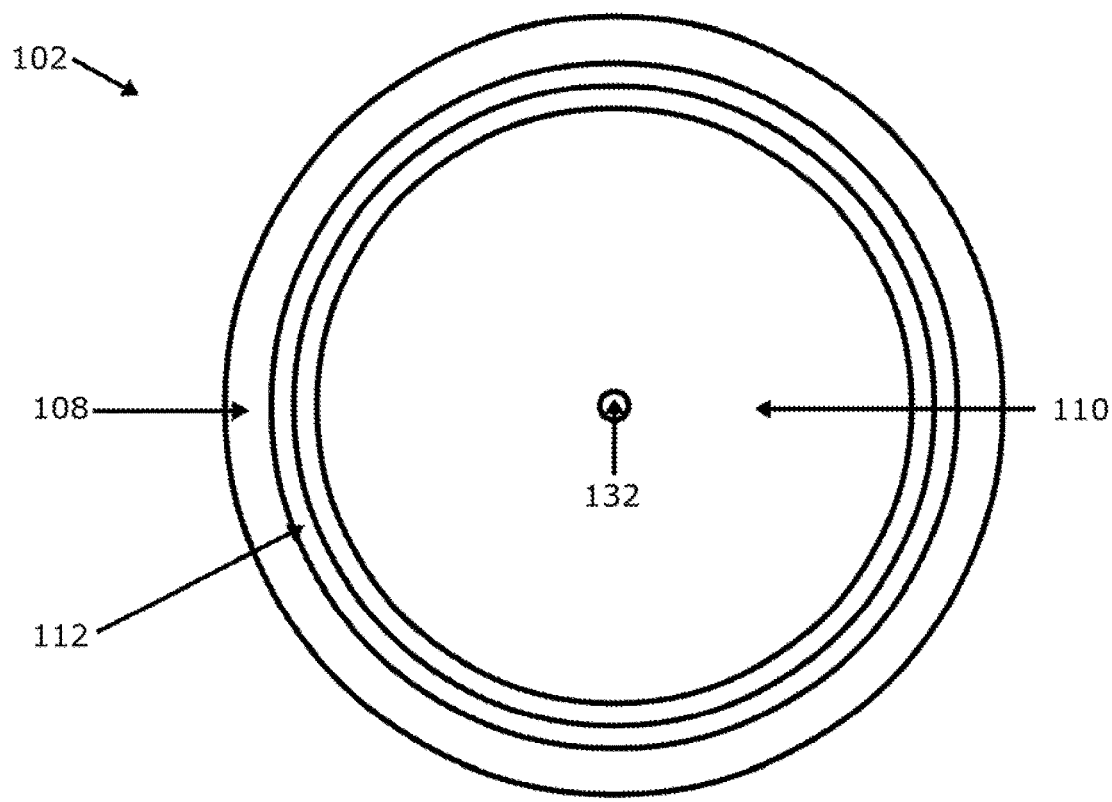
FIG. 3 is a downward view of a bull plug in an embodiment of the present invention.
Figure 4:
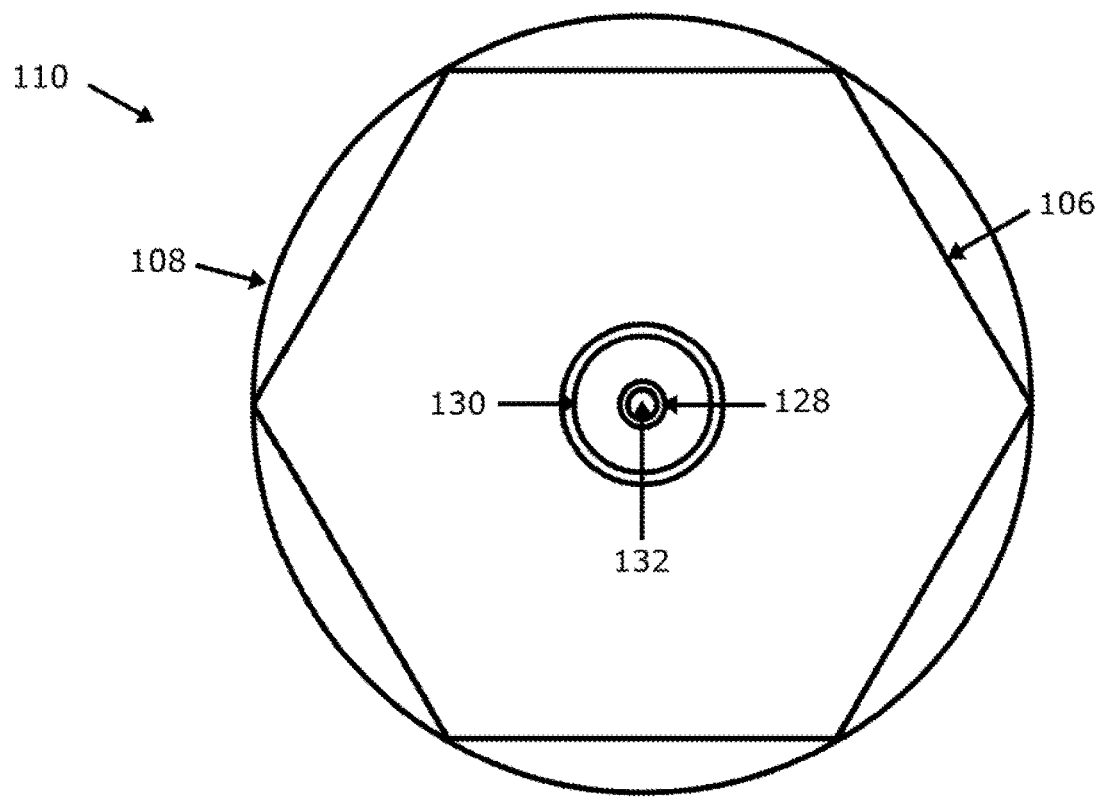
FIG. 4 is an upward view of a bull plug in an embodiment of the present invention.
Figure 5:
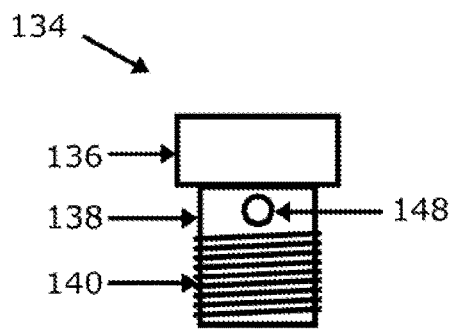
FIG. 5 is a side view of a bleed valve housing in an embodiment of the present inventions.
Figure 6:
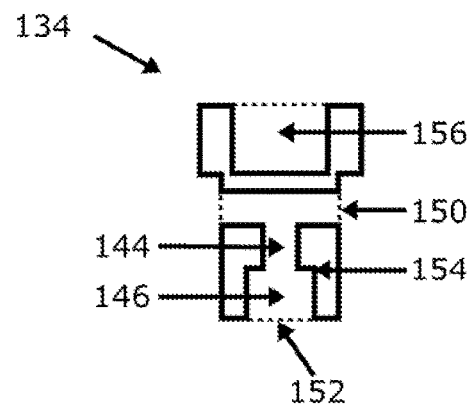
FIG. 6 is a side cutaway view of a bleed valve housing in an embodiment of the present invention.
Figure 7:
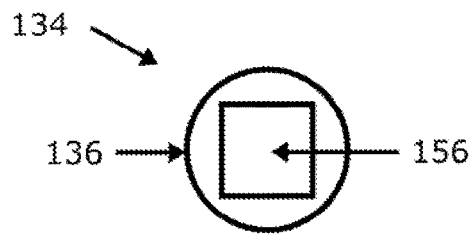
FIG. 7 is a downward view of a bleed valve housing in an embodiment of the present invention.
Figure 8:
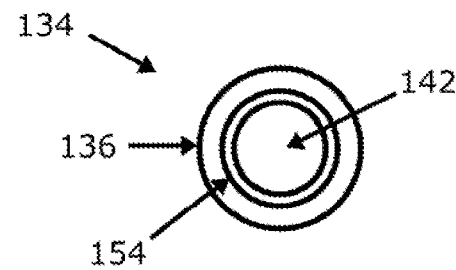
FIG. 8 is an upward view of a bleed valve housing in an embodiment of the present invention.
Figure 9:
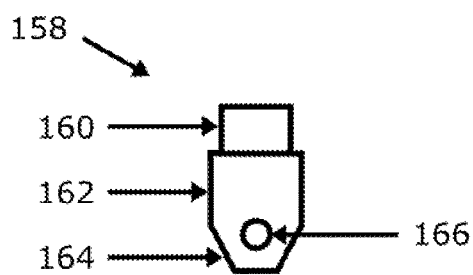
FIG. 9 is a side view of a bleed valve in an embodiment of the present inventions.
Figure 10:
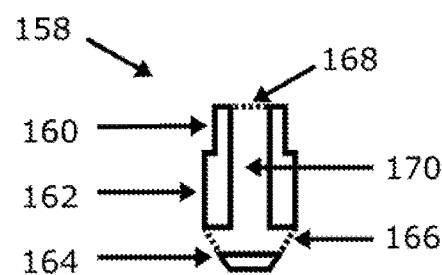
FIG. 10 in is a side cutaway view of a bleed valve in an embodiment of the present invention.
Figure 11:
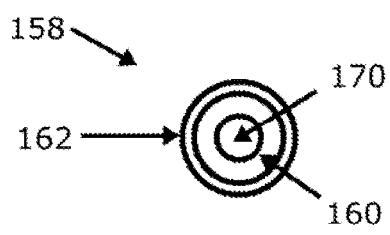
FIG. 11 is a downward view of a bleed valve in an embodiment of the present invention.
Figure 12:
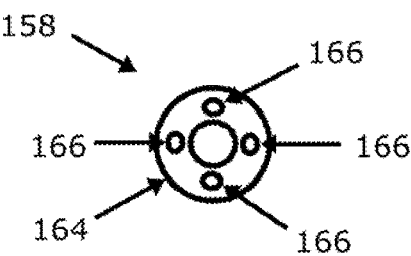
FIG. 12 is an upward view of a bleed valve housing in an embodiment of the present invention.

In describing and claiming embodiments of the present invention, relative terms such as "top," "bottom," and the like are sometimes used to identify portions of components. The use of such terms assumes relative orientations suggested by the drawings and does not limit how the embodiments may be oriented in the field.

Further, the following "First Embodiment" section provides a detailed description of the construction and use of one embodiment of the present invention. The "Alternative and Additional Embodiments" section that follows the First Embodiment section provides one of ordinary skill with possible modifications and extensions which complement the essential features of the present invention. Selection of some of these modifications and extensions may affect the quality of the general operation of the present invention in terms of performance when used for particular applications. Implementation of other modifications and extensions may be driven by costs of manufacture, availability of materials, physical constraints, and other factors which may be independent of the general operation of the present invention. The non-exclusive set of examples of alternative and additional embodiments may be mixed and matched as needed and as technically feasible so long as the detachable pressure evacuation device assembly can be readily and safely attached and used in case of emergency conditions and then removed once safe conditions have been restored.

First Embodiment

FIGS. 1 through 30 provide an embodiment of a pressure evacuation device which comprises fixed assembly 100, which is fitted into an opening of gas cylinder 300, and detachable assembly 200, which is attached to and detached from fixed assembly 100.

FIGS. 1 through 4 provide side, side cutaway, downward, and upward views of bull plug 102. Bull plug 102 has head 104 having hexagonal prism upper head 106 and a cylindrical lower head 108, and thread 110 extending downward from head 104. Head 104 is about 4¼ inches in diameter and about 1 inch tall. Thread 110 is about 3 inches in diameter, about 2 inches tall, and is cylindrical. Bull plug 102 is constructed from stainless steel.

Crevice 112 is an annular indentation located on the bottom of lower head 108, is about ¼ inch wide, about ¼ inch deep, and positioned slightly wider than thread 110. Crevice 112 is suitable for receiving seals 114 and 116 (not shown) when bull plug 102 is attached to gas cylinder 300 (not shown) to form a seal between bull plug 102 and gas cylinder 300. Seal 114 is an o-ring made of a fluoroelastomer (such as the fluoroelastomer commercially available under the brand name Viton™) and seal 116 is an o-ring made of a fluoropolymer (such as the fluoropolymer commercially available under the brand name Teflon™).

Bull plug opening 118 provides top access to cylindrical cavity 120 and is about ¾ inch in diameter. Cavity 120 comprises upper cavity 122, middle cavity 124, and lower cavity 126. Upper cavity 122 is about ¾ inch in diameter and about 1½ inches deep and has threaded walls running about halfway down from opening 118. Middle cavity 194 is about ⅝ inch in diameter, about ½ inch deep, and has threaded walls. Lower cavity 126 is about ⅛ inch in diameter, about 1 inch deep, and has angled bleed valve seat 128 at the top. Bleed valve housing stop 130 is formed where upper cavity 122 meets middle cavity 124. Bull plug inlet opening 132 provides bottom access to cavity 120 and is about ⅛ inch in diameter.

FIGS. 5 through 8 provide side, side cutaway, downward, and upward views of bleed valve housing 134. Bleed valve housing 134 has cylindrical head 136 about ⅜ inch tall and about ⅞ inch in diameter. Head 136 connects to cylindrical shank 138 about ¼ inch tall and about ¾ inch in diameter. Shank 138 connects to cylindrical thread 140 about ½ inch tall and about ¾ inch in diameter, Bleed valve housing 134 has cavity 142 between the bottom of thread 140 and shank 138, four equally-spaced outlet ports 148 pass through shank 138 and into cavity 142, and inlet port 152 in the bottom of thread 140 which opens into cavity 142. Outlet ports 148 are about ⅛ inch in diameter and inlet port 152 is about ½ inch in diameter. Cavity 142 has an upper cavity 144 and a lower cavity 146, and upper cavity 144 is slightly narrower than lower cavity 146 to form bleed valve stop 154. Valve stem interface 156 is a cubic cavity in the top of head 136 and is about ⅜ inch wide and about ⅜ inch deep. Bleed valve housing 134 is constructed from stainless steel.

FIGS. 9 through 12 provide side, side cutaway, downward, and upward views of bleed valve 158. Bleed valve 158 has an upper, middle, and lower portion, where upper bleed valve 160 is about ⅛ inch tall and about ⅜ inch in diameter, middle bleed valve 162 is about ⅜ inch tall and about ½ inch in diameter, and lower bleed valve 164 is about ¼ inch tall and tapers down from about ½ inch in diameter to about ¼ inch in diameter at the tip. Four equally-spaced inlet ports 166 pass through lower bleed valve 164 and into cavity 170, and outlet port 168 in upper bleed valve 160 opens into cavity 170. Bleed valve 158 is constructed from stainless steel.

Figure 13:
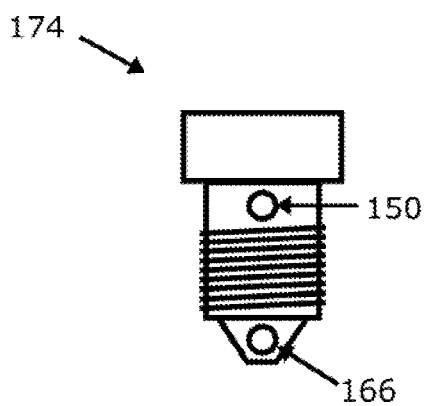
FIG. 13 is a side view of a bleed valve assembly in an embodiment of the present invention.

FIG. 13 provides a side view of bleed valve assembly 174, which is formed by inserting bleed valve 158 into inlet port 152 until bleed valve 158 reaches bleed valve stop 154. Air passes freely into bleed valve inlet ports 166, through cavity 170, and Out outlet ports 150.

Figure 14:
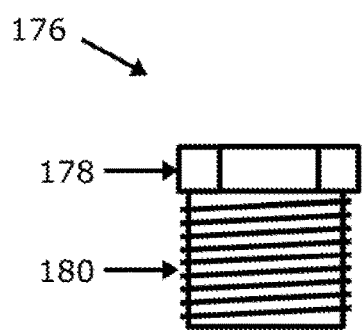
FIG. 14 is a side view of a safety plug in an embodiment of the present invention.
Figure 15:
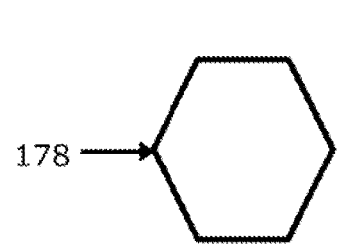
FIG. 15 is a downward view of a safety plug in an embodiment of the present invention.

FIGS. 14 and 15 provide side and downward views of safety plug 176. Hexagonal prism head 178 is about ¼ inch tall and about 1¼ inch in diameter. Cylindrical thread 180 is about ¾ inch tall, about 1 inch in diameter, and is circular. Safety plug 176 is constructed from brass.

Figure 16:
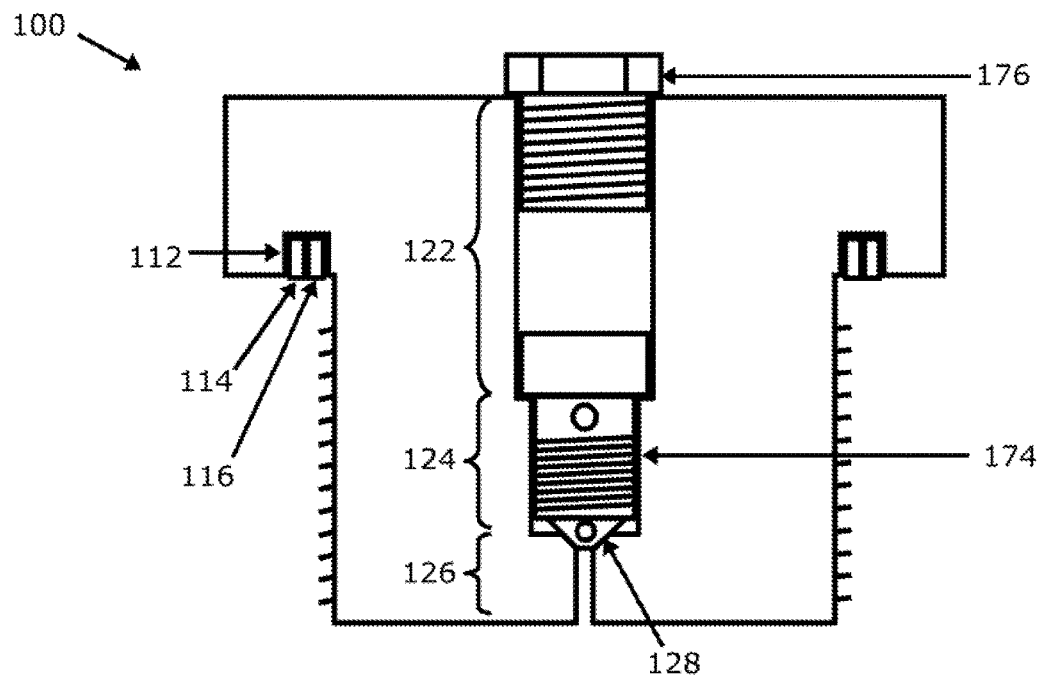
FIG. 16 is a side partial-cutaway view of a fixed assembly in an embodiment of the present invention.

FIG. 16 provides a side partial-cutaway view of fixed assembly 100, which is formed by inserting bleed valve assembly 174 into opening 118 (shown in FIG. 1) and through cavity 120. Bleed valve assembly 174 is then screwed into the threaded walls of middle cavity 124 until the tip of lower bleed valve 164 engages bleed valve seat 128. Because of these metal-to-metal engagements, upper cavity 122 is sealed off from lower cavity 126. Safety plug 176 is then screwed into the threaded walls of upper cavity 122, to form an additional seal between upper cavity 122 and the atmosphere above safety plug 176. Bull plug seals 114 and 116 are inserted into crevice 112.

Figure 17:
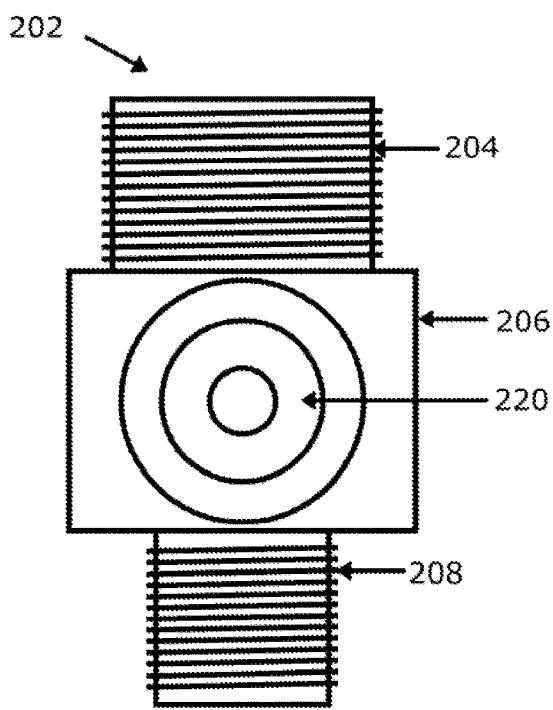
FIG. 17 is a front view of a valve tee in an embodiment of the present invention.
Figure 18:
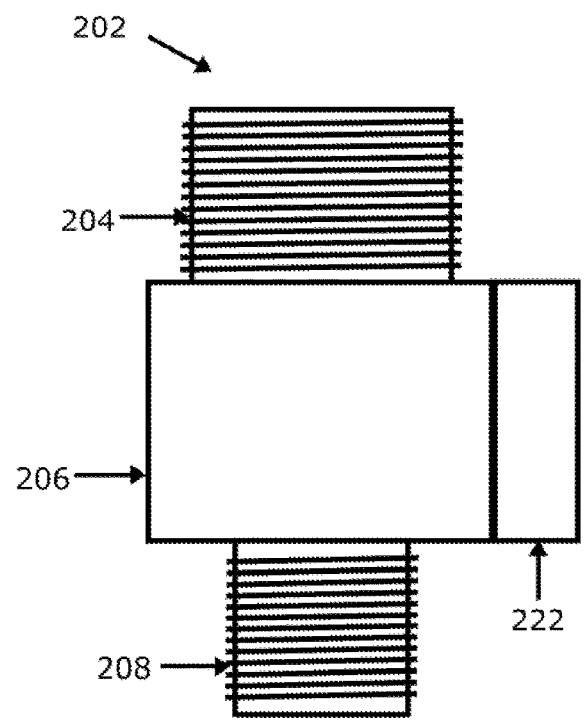
FIG. 18 is a side view of a valve tee in an embodiment of the present invention.
Figure 19:
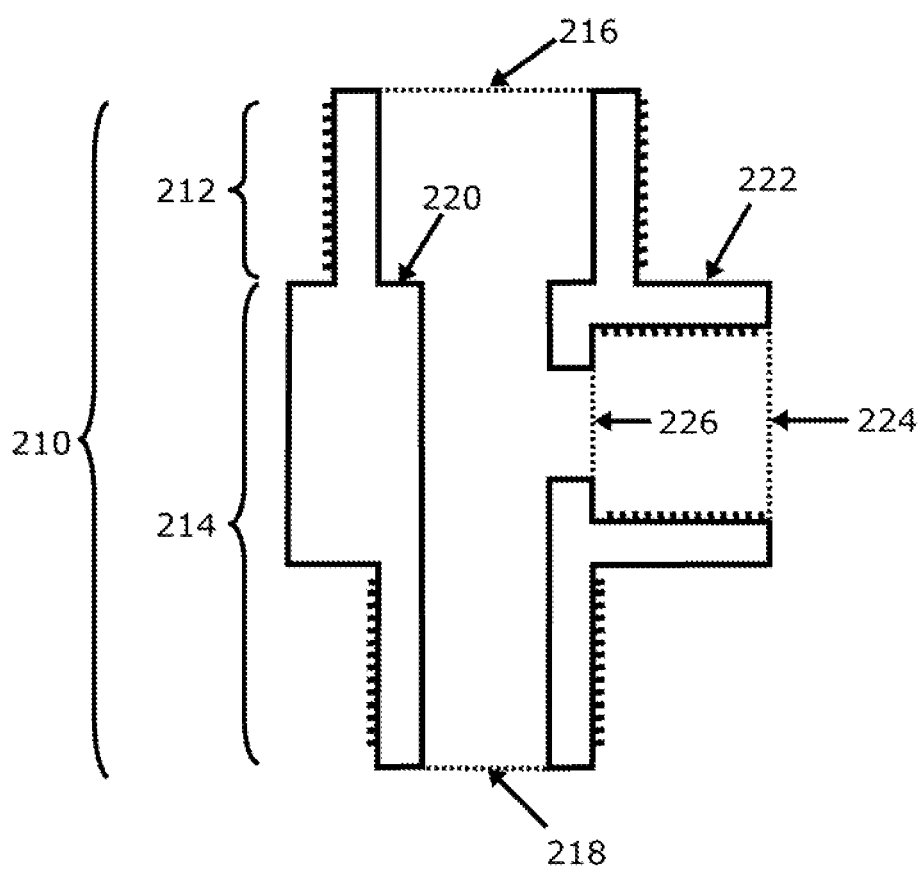
FIG. 19 is a side cutaway view of a valve tee in an embodiment of the present invention.

FIGS. 17 through 19 provide front, side, and side cutaway views of valve tee 202. Tee 202 has a cylindrical threaded top connector 204 which is about 1 inch tall, about 1½ inches in its outer diameter, and about 1 inch in its inner diameter, a cuboid body 206 which is about 1½ inches tall, about 2 inches wide, and about 2 inches long, and a cylindrical threaded bottom connector 208 which is about 1 inch tall, about ¾ inch in its outer diameter, and about ⅝ inch in its inner diameter. Cylindrical tee cavity 210 extends between tee top opening 216 and tee bottom opening 218. Upper cavity 212 is about 1 inch tall and about 1 inch in diameter and lower cavity 214 is about 2½ inches tall and about ⅝ inch in diameter. Valve stem stop 220 is formed within tee cavity 210 where upper cavity 212 meets lower cavity 214. Tee 202 also has a cylindrical side connector 222 which pass through body 206, is about 1½ inches tall, about 1½ inches in its outer diameter, and about 1 inch in its inner diameter. The inside wall of side connector 222 is threaded. Side connector opening 224 is about 1½ inches in diameter and side connector opening 226 is about ⅝ inch in diameter. Tee 202 is constructed from brass.

Figure 20:
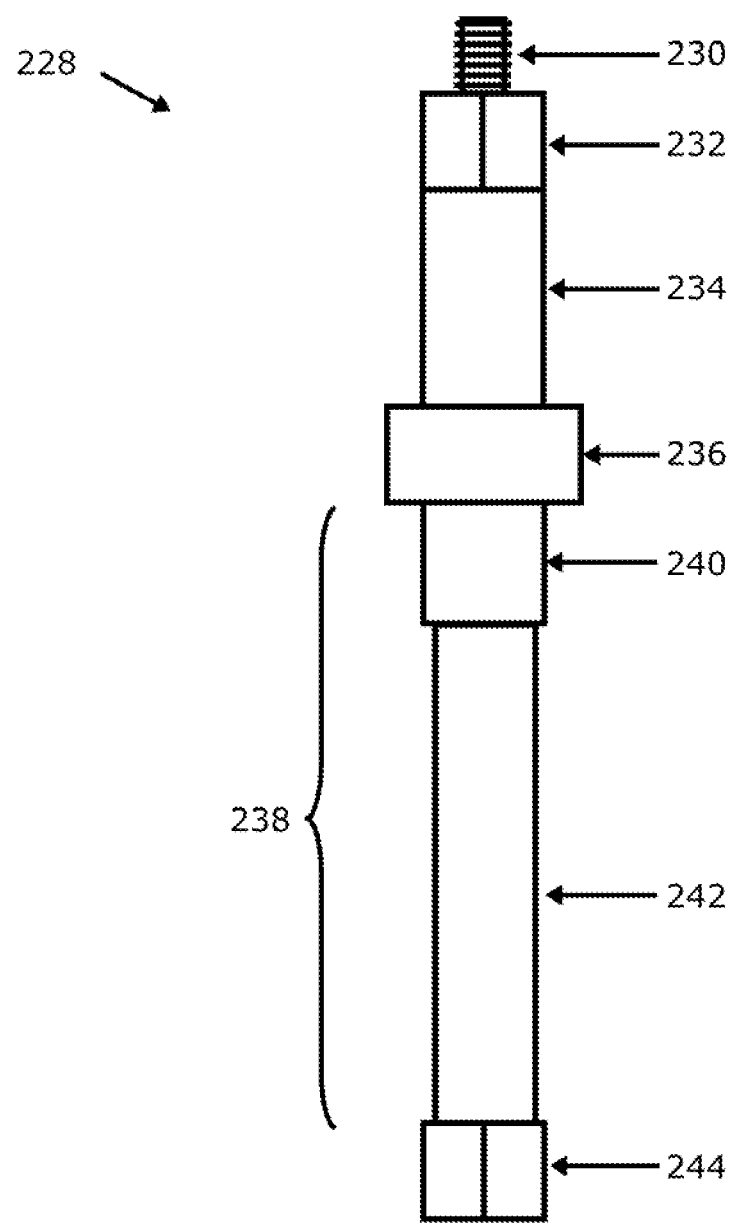
FIG. 20 is a side view of a valve stem in an embodiment of the present invention.
Figure 21:
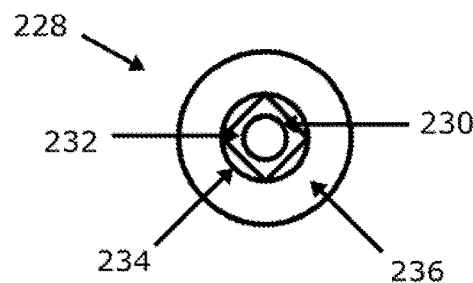
FIG. 21 is a downward view of a valve stem in an embodiment of the present invention.
Figure 22:
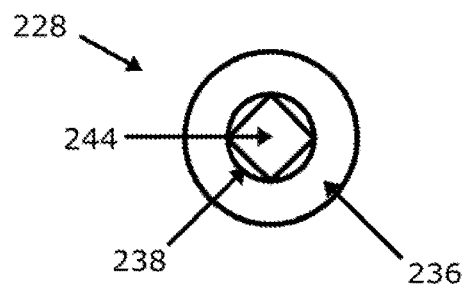
FIG. 22 is an upward view of a Ave stem in an embodiment of the present invention.
Figure 23:
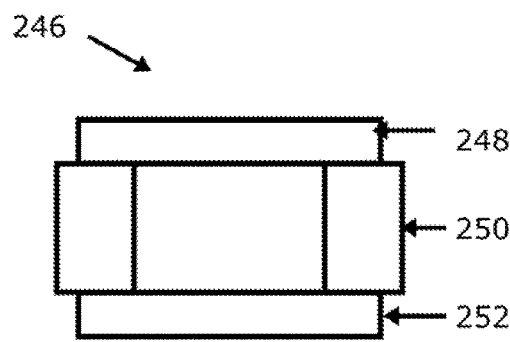
FIG. 23 is a side view of a valve bonnet in an embodiment of the present invention.
Figure 24:
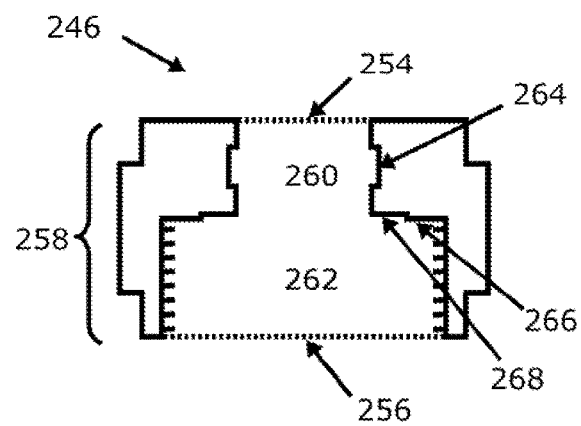
FIG. 24 is a side cutaway view of a valve bonnet in an embodiment of the present invention.
Figure 25:
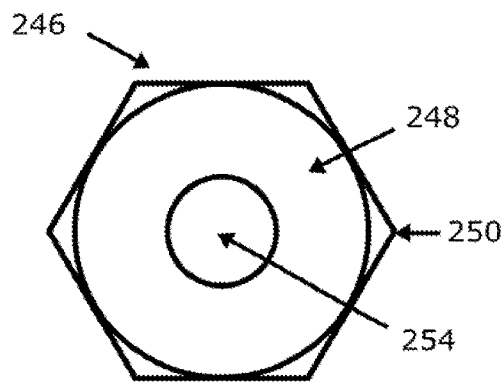
FIG. 25 is a downward view of a valve bonnet in an embodiment of the present invention.
Figure 26:
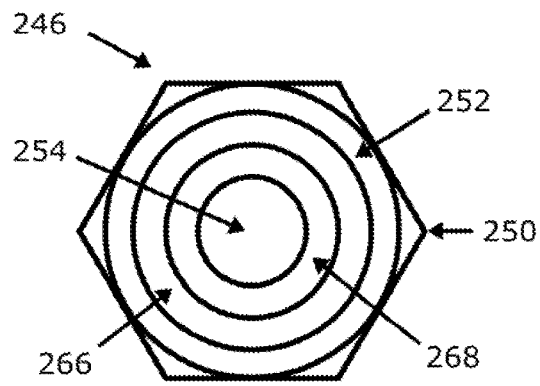
FIG. 26 is an upward view of a valve bonnet in an embodiment of the present invention.

FIGS. 20 through 22 provide side, downward, and upward views of valve stem 228. Valve stem 228 has a threaded cylindrical post 230 which is about ¼ inch in diameter, a cubic handle interface 232 which is about ⅜ inch tall, long, and wide, a cylindrical upper stem shaft 234 which is about 1 inch tall and about ⅝ inch in diameter, a cylindrical middle stem shaft 236 which is about ½ inch tall and about 1 inch in diameter, a cylindrical lower stem shaft 238 which is about 3 inches tall and about ⅝ inch in diameter in stem shaft 240 and about ½ inch in diameter in stem shaft 242, and a cubic bleed valve interface 244 which is about ⅜ inch tall, long, and wide. Valve stem 228 is constructed from stainless steel.

FIGS. 23 through 26 provide side, cutaway, downward, and upward views of valve bonnet 246. Bonnet 246 has a cylindrical upper bonnet 248 which is about ¼ inch tall and about 2 inches in diameter, a hexagonal middle bonnet 250 which is about ¾ inch tall and about 2 inches in diameter, and a cylindrical lower bonnet 252 which is about ¼ inch tall, has an inner diameter of about ⅝ inch, and has an outer diameter of about 2 inches. Valve stem opening 254 is located in the center of upper bonnet 248 and is about ⅝ inch in diameter. Valve tee opening 256 is located in the center of lower bonnet 252 and is about 1½ inches in diameter. Between valve stein opening 254 and valve tee opening 256, bonnet 246 has a cylindrical cavity 258 having a cylindrical upper cavity 260 and a cylindrical lower cavity 262. Upper cavity 260 has an indentation 264. Lower cavity 262 has threaded walls and an annular valve stem stop 268 where lower cavity 262 meets upper cavity 260. Annular valve stem stop 268 has an inner diameter of about ⅝ inch, an outer diameter of about 1⅛ inches, is about 1/16 inch tall. Annular valve seal 266 is outside of and slightly lower than valve stein stop 268 and has an inside diameter of about 1⅛ inches and an outer diameter of about 2 inches. Bonnet 246 is constructed from brass.

Figure 27:
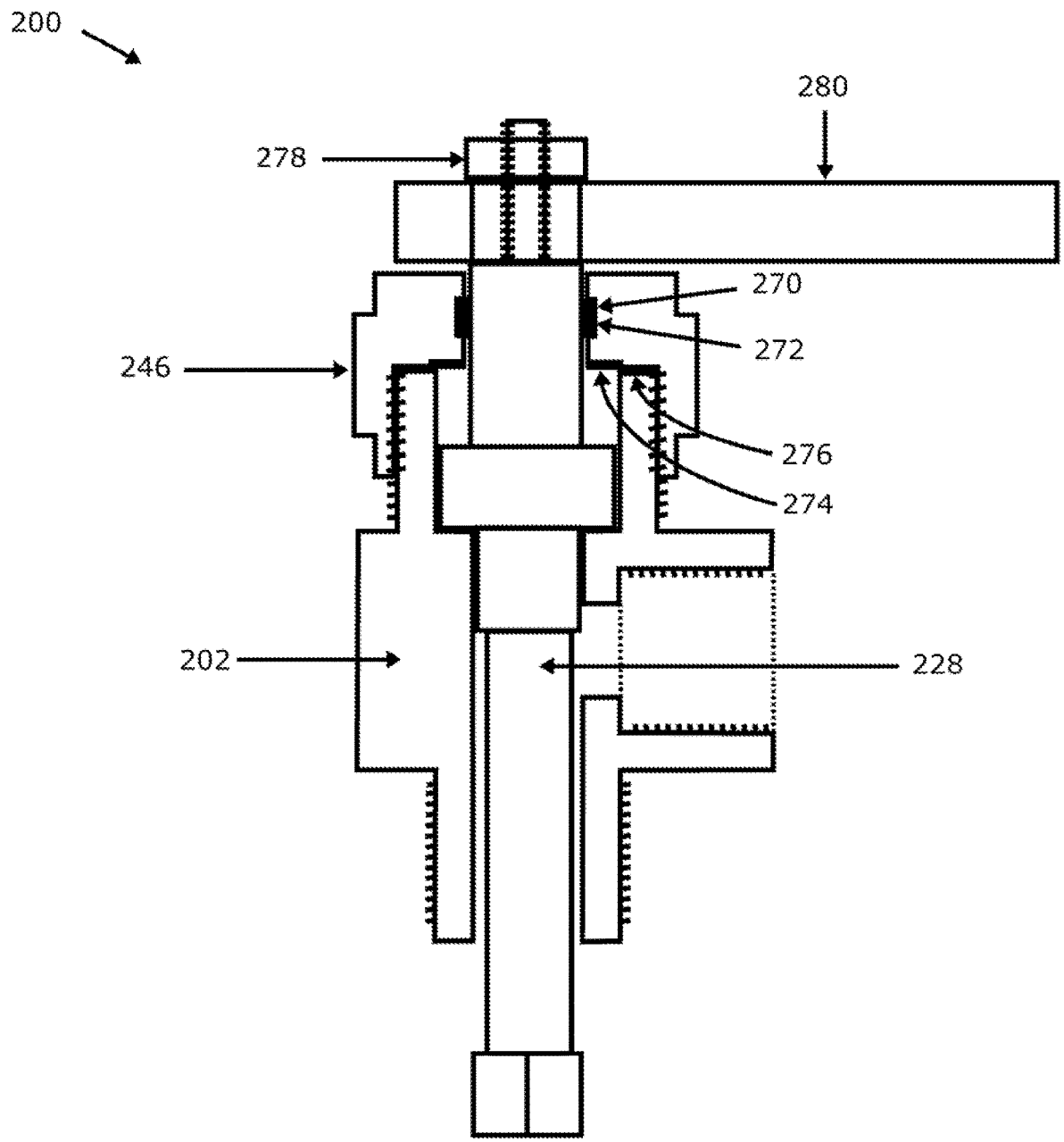
FIG. 27 is a side cutaway view of a detachable assembly in an embodiment of the present invention.

FIG. 27 provides a side partial-cutaway view of detachable assembly 200. Valve stem 228 is inserted into tee 202 through tee top opening 216 and through tee cavity 210 until middle stem shaft 236 engages valve stem stop 220; in this position, lower stem shaft 238 and bleed valve interface 244 extend out tee bottom opening 218. Sealing o-rings 270 and 272 are inserted into bonnet indentation 264, thrust washer 274 is placed onto stem stop 268, and sealing ring 276 is placed onto valve seal 266. Sealing o-ring 270 is made of a fluoropolymer (such as the fluoropolymer commercially available under the brand name Teflon™), sealing o-ring 272 is made of a fluoroelastomer (such as the fluoroelastomer commercially available under the brand name Viton™), thrust washer 274 is made of a durable nylon plastic filled with molybdenum disulphide (such as the nylon plastic commercially available under the brand name Nylatron®), and seal ring 276 is made of stainless steel coated with a fluoropolymer (such as the fluoropolymer commercially available under the brand name Teflon™). Bonnet 246 is screwed onto tee top connector 204. A slight gap between the walls of tee 202 in lower cavity 214 and lower stem shaft 238 allows for enough freedom of movement such that stem 228 can rotate within tee 202 and allow the flow of gas between lower valve stem shaft 238 and the walls of tee 202 in lower cavity 214. This also allows for vertical freedom of movement of middle stem shaft 236 between thrust washer 274 and stem stop 220. However, an airtight seal is formed between upper stem 234 and o-rings 270 and 272 and between tee top connector 204 and sealing ring 276. Handle 280 is attached over handle interface 232 and is secured by screwing handle nut 278 to post 230.

Figure 28:
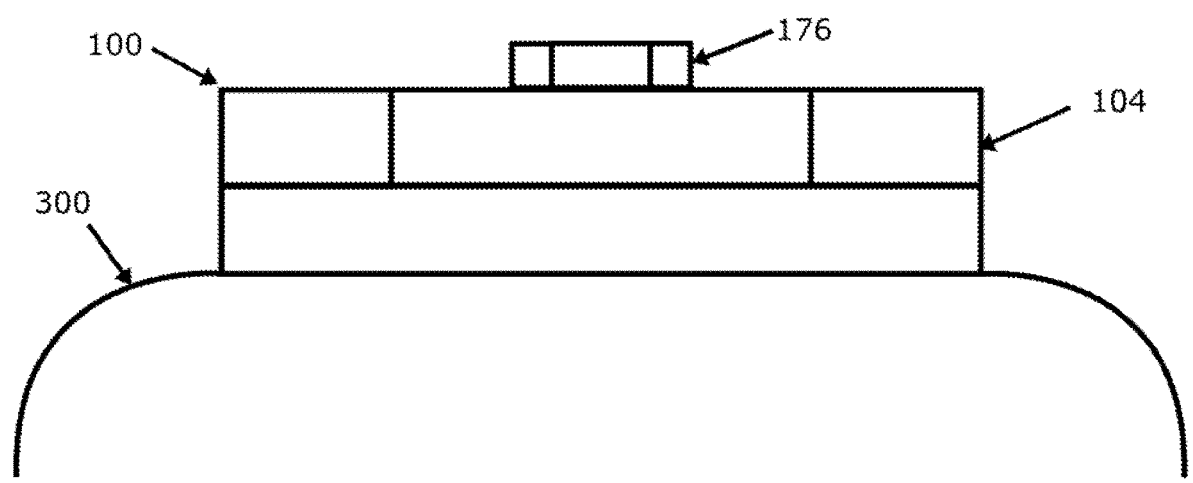
FIG. 28 is a side external view of a gas cylinder with the assembly attached to the cylinder in an embodiment of the present invention.

FIG. 28 provides an external view of safety plug 176 as installed in a cylinder 300. Thread 110 of fixed assembly 100 has been screwed into a threaded opening in an end of cylinder 300. When installed, only safety plug 176 and bull plug head 104 are visible from the outside.

In case of an emergency need to vent gas from cylinder 300, the operator performs the following steps:

1. Unscrew safety plug 176 from the threaded walls of upper cavity 122.

2. Screw detachable assembly 200 into the threaded walls of upper cavity 122.

Figure 29:
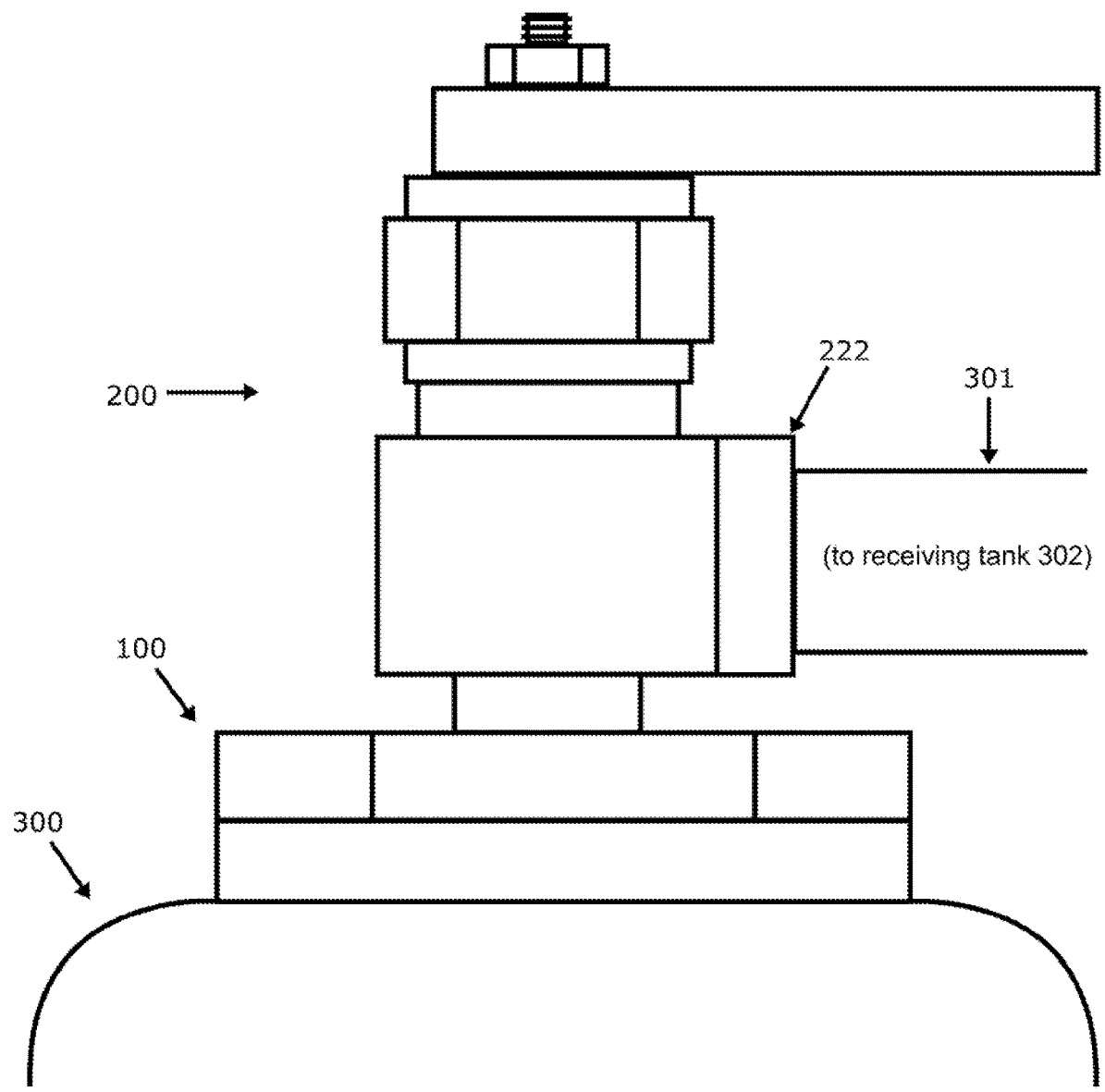
FIG. 29 is a side external view of a gas cylinder with the fixed assembly attached to the cylinder and the detachable assembly and discharge hose attached to the fixed assembly in an embodiment of the present invention.

3. Screw in discharge hose 301 into opening 224 of side connector 222; hose 301 may lead to a receiving tank 302 (not shown). FIG. 29 provides an external view of detachable assembly 200 and discharge hose 301 attached to fixed assembly 100, which is in turn attached to cylinder 300.

4. Open receiving tank 302.

5. Push stem 228 downward so that bleed valve interface 244 enters valve stem interface 156; this may require rotation of stem 228 up to 90° to align bleed valve interface 244 and valve stem interface 156.

6. Turn stem 228 counter-clockwise using handle 280; this screws bleed valve housing 134 upward, retracting bleed valve 158 away from bleed valve seat 128 to open a passageway between inlet ports 166 and lower cavity 126. The pressure of the gas may push middle stem shaft 236 into stem stop 268.

Figure 30:
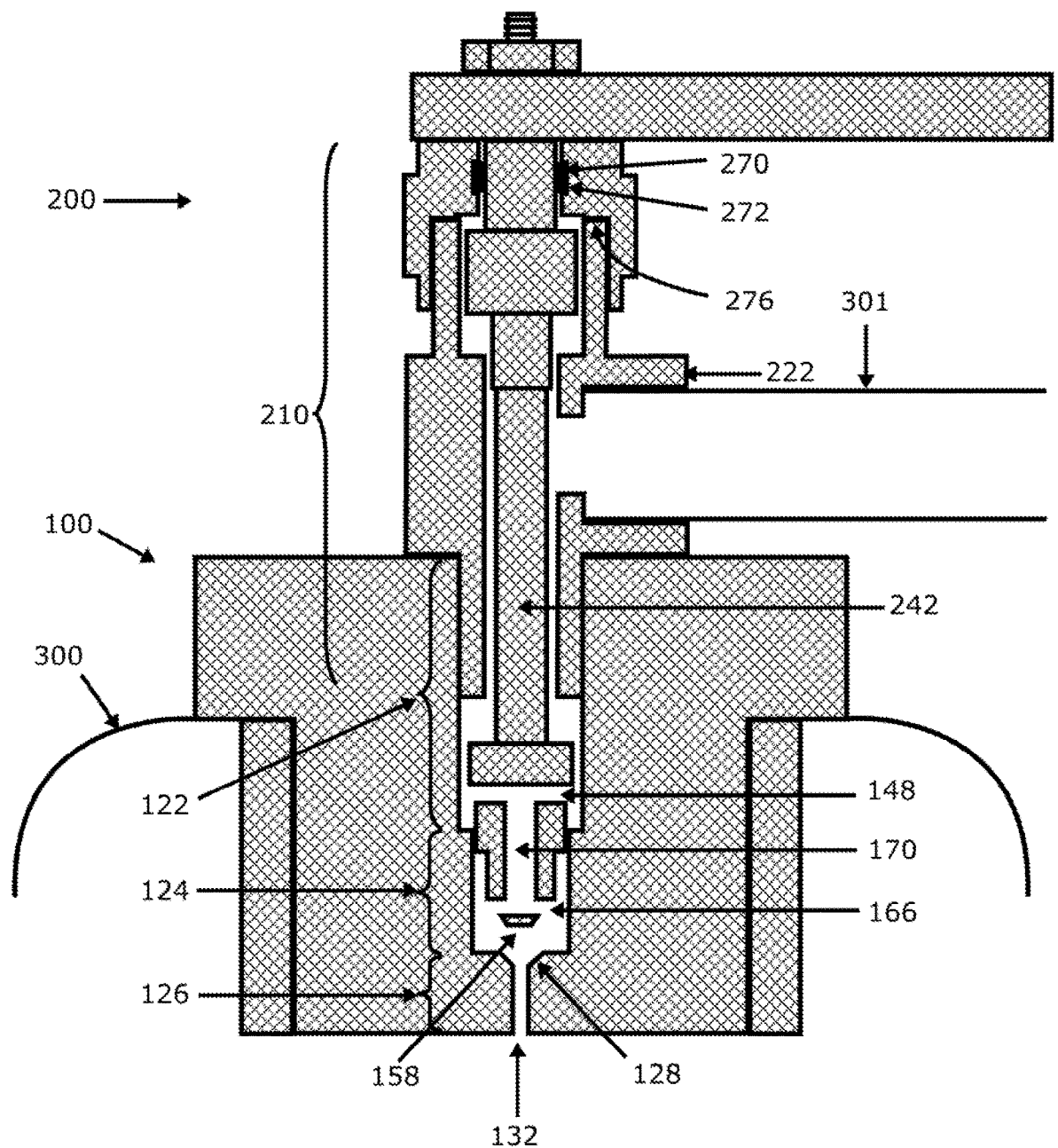
FIG. 30 is a side cutaway view of the fixed assembly, detachable assembly, gas cylinder, and discharge hose in an embodiment of the present invention showing the open regions where gas may flow.

FIG. 30 shows a side cutaway view of cylinder 300, fixed assembly 100, and detachable assembly 200 after completion of steps 1 through 6. The dimensions of the solid components (shown in solid lines and cross-hatch fill) are slightly exaggerated to show the open areas (shown without cross-hatch fill). Since the tip of bleed valve 158 has been retracted from bleed valve seat 128, there is a pathway for gas to travel from cylinder 300 through bull plug inlet opening 132, into lower cavity 126, into middle cavity 124, into bleed valve inlet ports 166, through bleed valve cavity 170, out bleed valve housing outlet ports 148, into upper cavity 122, between the walls of upper cavity 122 and stem shaft 242, between the walls of cavity 210, out of valve tee 202 through side connector 222, and into discharge hose 301. Note that gas may fill enter cavity 210, however seals 270, 272, and 276 prevent gas from escaping cavity 210 except through side connector 222.

Once the operator has vented sufficient gas from cylinder 300, steps 1 through 6 are effectively performed in reverse:

7. Close receiving tank 302.
8. Turn stem 228 clockwise using handle 280; this screws bleed valve housing 134 downward, unretracting bleed valve 158 back into contact with bleed valve seat 128 to close the passageway between inlet ports 166 and lower cavity 126.
9. Pull stem 228 upward so that bleed valve interface 244 disengages from valve stem interface 156.
10. Unscrew detachable assembly 200 from fixed assembly 100.
11. Screw safety plug 176 back into fixed assembly 100.

Alternative and Additional Embodiments

The present invention as described in the foregoing embodiment may be modified and/or extended by one of ordinary skill without departing from the spirit of the present invention, so long as the modifications and/or extensions do not affect the safe operation of the device. Selection of some of these modifications and extensions may affect the quality of the general operation of the present invention in terms of performance when used for particular applications. Other modifications and extensions may be driven by costs of manufacture, availability of materials, physical constraints, and other factors which may be independent of the general operation of the present invention. The following variations represent a non-exclusive list of examples of other embodiments which may be mixed and matched as needed and as technically feasible without affecting the general functionality.

The dimensions of the various components described in the first embodiment are approximations, and as one of ordinary skill in the art will recognize, in order to function properly, components which engage with one another must have matching diameters and thread sizes. Similarly, components which fit within other components may be sized to accommodate ease of fitting and operation. Further, the components of fixed assembly too and detachable assembly 200 may be scaled up or down to accommodate larger or smaller sizes of cylinder 300.

The various threaded connection mechanisms described in the first embodiment may be replaced with alternative mechanisms provided that the alternative mechanism does not compromise safety or operability of the pressure evacuation device. By way of example and not limitation, in other embodiments side connector 222 could have its threads on the outside or it could be a cam/groove or camlock style connector.

The first embodiment describes the use of specific materials for the various components of the pressure evacuation device, however the components may be manufactured from other materials provided that alternative materials do not compromise the safety or operability of the pressure evacuation device. By way of example and not limitation, in other embodiments materials other than brass and stainless steel may be used for the metallic components of fixed assembly 100 and detachable assembly 200, materials other than fluoroelastomers and fluoropolymers can be used for seals 114 and 116, materials other than fluoroelastomers and fluoropolymers may be used for rings 270 and 272, a material other than nylon plastic may be used for thrust washer 274, and a material other than fluoropolymer-coated stainless steel may be used for seal ring 276. Further, some of the sealing mechanisms described in the first embodiment use two components, for example, o-rings 270 and 272, however a given sealing mechanism may comprise any number of components.

In the first embodiment, valve stem interface 156 is a cube-shaped cavity in the top of head 136 and bleed valve interface 244 is a corresponding cube-shaped tip at the end of valve stem 228. In other embodiments, other mechanisms could be used to mate the valve stem to the bleed valve, provided that the valve stem can be mated quickly and securely to the bleed valve.

In the first embodiment, bleed valve assembly 174 comprises bleed valve 158 and bleed valve housing 134. In other embodiments, the functionality of bleed valve housing 134 could be integrated into bleed valve 158 to reduce the number of components needed to manufacture the pressure evacuation device.

In the first embodiment, handle 280 attaches mates with handle interface 232 on valve stem 228 and is held in place by nut 278 on post 230. In other embodiments, the functionality of handle 280 could be provided by a valve wheel or by a fixed or adjustable wrench.

The process for attaching detachable assembly 200 to fixed assembly 100 may include application of a lubricant to the threads in upper cavity 122 and/or wrapping fluoropolymer tape onto bottom connector 208 in order to ease attaching detachable assembly 200 to fixed assembly 100.

The invention claimed is:

1. A pressure relief device for a high-pressure compressed gas cylinder comprising:
    a fixed assembly comprising a bull plug and a bleed valve, the bull plug comprising a top opening and a bottom opening which are on opposite ends of a bull plug cavity within which the bleed valve is positioned; and
    a detachable assembly comprising a valve stem and a valve tee, the valve stem positioned at least in part within an interior cavity of the valve tee and configured to open the bleed valve to allow gas to escape from an interior of the cylinder through the fixed assembly and detachable assembly and out the valve tee,
    where the fixed assembly is configured to be screwed into and out of an opening in the cylinder, and
    where the detachable assembly is configured to be screwed into and out of the top opening of the bull plug.

2. The pressure relief device of claim 1, the bull plug further comprising:
    a thread for engaging with a corresponding threaded wall of the opening in the cylinder, the thread comprising a bottom surface and the bottom surface comprising the bottom opening; and
    a head configured to facilitate rotation of the bull plug to screw and unscrew the fixed assembly into and out of the opening in the cylinder, the head comprising a top surface the top surface comprising the top opening;
    where the bull plug cavity comprises an upper bull plug cavity, a middle bull plug cavity that is narrower than the upper bull plug cavity, and a lower bull plug cavity that is narrower than the middle bull plug cavity and that forms a valve seat where the middle bull plug cavity and lower bull plug cavity meet, where a part of the bleed valve is located in the upper bull plug cavity and a part of the bleed valve is located in the middle bull plug cavity, and where
    threads on the walls of the middle bull plug cavity engage with corresponding threads on the outside of the bleed valve, such that rotating the bleed valve one direction retracts the tip of the bleed valve away from contact with the valve seat and rotating the bleed valve the other direction unretracts the tip of the bleed valve bringing it into contact with the valve seat.

3. The pressure relief device of claim 2:
where the top opening of the bull plug accommodates a safety plug when the detachable assembly is not attached to the fixed assembly,
where the safety plug prevents debris from entering the bull plug cavity, and
where the safety plug provides a seal to prevent the flow of gas out of the cylinder.

4. The pressure relief device of claim 2, the bull plug further comprising:
a bottom surface on the head;
an annular crevice on the bottom surface of the head; and
a sealing ring in the annular crevice, such that when the bull plug is attached to the cylinder, the sealing ring prevents the flow of gas out of the cylinder.

5. The pressure relief device of claim 2, the bleed valve comprising:
a head comprising a top surface, the top surface comprising an opening shaped to engage with a correspondingly-shaped end portion on the bottom of the valve stem; and
a shank comprising an outlet port;
where tip of the bleed valve comprises an inlet port and
where the tip of the bleed valve is shaped to engage with a correspondingly-shaped top portion of the valve seat.

6. The pressure relief device of claim 5,
where the head of the bleed valve is wider in diameter than the remainder of the bleed valve,
where a valve stop is formed in the bull plug cavity where the upper bull plug cavity and middle bull plug cavity meet, and
where the head works cooperatively with the valve stop to limit vertical movement of the bleed valve.

7. The pressure relief device of claim 2, the valve tee comprising:
a top opening;
a side opening;
a bottom opening;
a first tee cavity between the top opening and the bottom opening; and
a second tee cavity between the first tee cavity and the side opening,
where the valve stem comprises a top stem which extends above the top opening, a middle stem which is located within the first tee cavity, and a bottom stem which extends below the bottom opening, and
where there are gaps between the middle stem and the first tee cavity such that the valve stem can move vertically and rotationally within the first tee cavity and such that gas can move between the middle stem and the first tee cavity.

8. The pressure relief device of claim 7, further comprising:
a handle which engages with the top stem to facilitate rotation of the valve stem.

9. The pressure relief device of claim 7:
where the valve tee further comprises a valve tee connector surrounding the bottom opening, the valve tee connector comprising outside threads.

10. The pressure relief device of claim 7, the detachable assembly further comprising:
a bonnet connector around the top opening of the valve tee, the bonnet connector comprising outside threads; and
a bonnet comprising a top side having an opening for the valve stem, side walls having inside threads, a bonnet cavity formed by the top side and side walls, and an opening in the bottom for attaching the bonnet to the bonnet connector.

11. The pressure relief device of claim 10, the bonnet further comprising:
an o-ring in the opening in the top side of the bonnet, the o-ring providing an air-tight seal between the bonnet and the valve stem; and
a washer in the bonnet cavity, the washer providing an air-tight seal between the bonnet and the bonnet connector.

12. The pressure relief device of claim 11:
where a first portion of the middle stem is narrower in diameter than a second portion of the middle stem, the first portion being above the second portion,
where a third portion of the middle stem is narrower in diameter than the second portion of the middle stem, the third portion being below the second portion, and
where the second portion of the middle stem limits motion of the valve stem between the bonnet and a stop within the first tee cavity.

13. The pressure relief device of claim 10, the valve tee further comprising:
a hose connector around the side opening of the valve tee, the hose connector suitable for connecting a gas discharge hose.

14. The pressure relief device of claim 1:
where the bull plug is made of stainless steel, and
where the bleed valve is made of stainless steel.

15. The pressure relief device of claim 1:
where the cylinder has a service pressure over 500 pounds per square inch.

16. The pressure relief device of claim 1:
where the cylinder has a service pressure over 2000 pounds per square inch.

17. The pressure relief device of claim 1:
where the opening in the cylinder is at least 0.75 inches in diameter.

18. The pressure relief device of claim 1:
where the opening in the cylinder is at least 3 inches in diameter.

19. A method for removing compressed gas from a high pressure compressed gas cylinder, the method comprising:
attaching a detachable assembly into a fixed assembly on the cylinder by mating outside threads on a lower portion of the detachable assembly with inside threads in an opening in an upper portion of the fixed assembly, where the detachable assembly comprises a valve tee and a rotatable valve stem, where the fixed assembly comprises a cavity between the interior of the cylinder and the exterior of the cylinder, and where a retractable bleed valve resides within the cavity;
engaging the valve stem with the bleed valve;
rotating the valve stem to retract the bleed valve and allow the passage of gas from the cylinder through the cavity, into the valve tee, and out the valve tee; and
rotating the valve stem to unretract the bleed valve and stop the passage of gas from the cylinder.

20. The method of claim 19, further comprising:
an initial step of removing a safety plug from the fixed assembly; and a final step of re-inserting the safety plug back into the fixed assembly.

21. The method of claim 19:
where the cylinder has a service pressure over 500 pounds per square inch.

22. The method of claim 19:
where the cylinder has a service pressure over 2000 pounds per square inch.

23. The method of claim 19:
where the opening in the cylinder is at least 0.75 inches in diameter.

24. The method of claim 19:
where the opening in the cylinder is at least 3 inches in diameter.

* * * * *